United States Patent [19]

Kroy et al.

[11] Patent Number: 4,644,202
[45] Date of Patent: Feb. 17, 1987

[54] SEALED AND BALANCED MOTOR AND FLUID PUMP SYSTEM

[75] Inventors: Ralph E. Kroy, Tranada Hills; Fritz C. Catterfeld, Canoga Park, both of Calif.

[73] Assignee: Rockwell International Corporation, El Segundo, Calif.

[21] Appl. No.: 722,915

[22] Filed: Apr. 15, 1985

[51] Int. Cl.$^4$ .............................................. H02K 9/00
[52] U.S. Cl. ....................... 310/58; 310/62; 310/90; 310/114; 310/156; 310/268; 277/53; 384/316; 417/370
[58] Field of Search .............. 310/46, 66, 156, 90, 310/268, 114, 112, 62, 63, 89, 54, 58, 88, 59, 310/60 R, 61, 52, 67 R; 417/369; 370; 384/313, 384/316; 277/53; 415/174

[56] References Cited

U.S. PATENT DOCUMENTS

| | | |
|---|---|---|
| 3,115,839 | 12/1963 | Pollak et al. .................. 417/369 |
| 3,912,284 | 10/1975 | Gosling ............................ 277/53 |
| 4,438,359 | 3/1984 | Royer .............................. 310/90 |
| 4,451,749 | 5/1984 | Kanayama et al. ............. 310/268 |
| 4,466,620 | 8/1984 | Orlowski ......................... 277/53 |
| 4,545,586 | 10/1985 | von Pragenau ................. 277/53 |

FOREIGN PATENT DOCUMENTS

1172462  4/1957  France .............................. 417/370

*Primary Examiner*—R. Skudy
*Attorney, Agent, or Firm*—H. Fredrick Hamann; Harry B. Field; David C. Faulkner

[57] ABSTRACT

A pancake, d.c., brushless electric motor 10 and pump 32 in which the rotating parts of the pump 32 are integral with the rotor 18 of the motor 10. The motor and pump housing is hermetically sealed from the flow of the pumped fluid. A small portion of fluid is leaked through a seal 38 and acts to cool the motor 10 and to lubricate a sleeve bearing 24 which supports the rotor 18 on the motor's stationary shaft 26. The rotor 18 has permanent magnets 22 divided into two sets which lie on opposite sides of the poles of the stator coils 14 and, therefore, the magnetic thrust between stator and rotor is balanced out.

10 Claims, 1 Drawing Figure

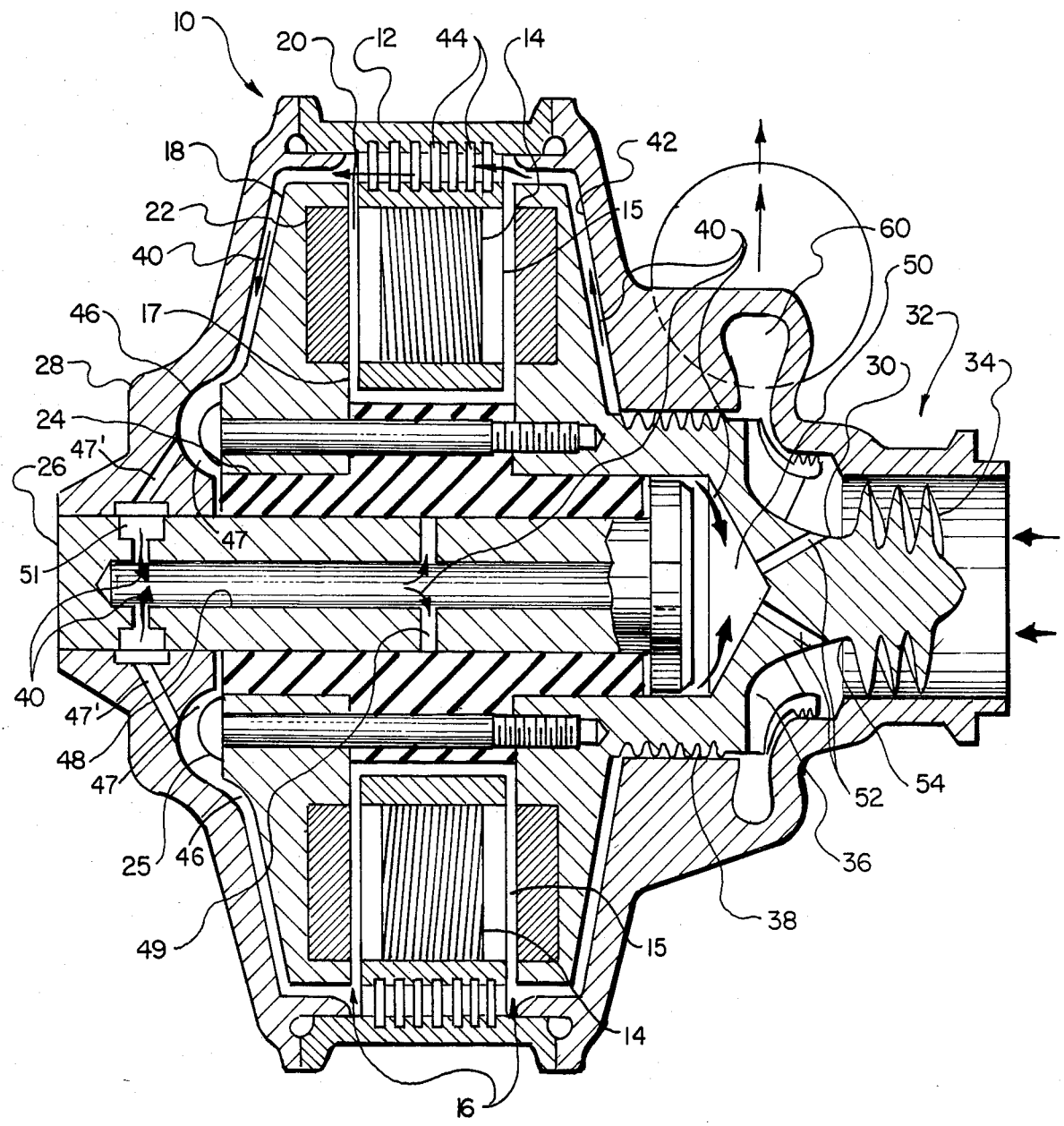

SEALED AND BALANCED MOTOR AND FLUID PUMP SYSTEM

BACKGROUND OF THE INVENTION

This invention relates to a pancake motor pump and especially to a hermetically sealed, magnetic-thrust-balanced, fluid pump system.

For spacecraft propulsion requiring pumps for propellant pressurization the preferred method is the electric motor pump drive operating at high speed requiring no purge gas and operating safely without seals. The commonly used method utilizes a hot gas tubine powering the propellant pump. High speed compact motors in the multiple horsepower range, however, are not readily available, even in the specialized electric motor industry. The replacement of the high temperature gas turbine to drive the propellant pump with a new type of high speed electric motor eliminates the following:

Problems related to high temperature and high structural stress.

Thermal heat soakback into the propellant pumps.

Separation of hot turbine gas and pump propellant fluid.

Helium purge gas.

Turbine gas generator and related hardware.

OBJECTS OF THE INVENTION

An object of the invention is to provide a lightweight and compact pancake-type, d.c., high-speed, electric motor, especially for use in conjunction with propellant pumps in rocket engines.

Another object is to provide such a motor in combination with a load which is integrally connected to the rotor component of the motor.

A further object is to provide such a motor in combination with a pump, wherein the pump impeller and shaft are integrally connected with the rotor component of the motor.

Yet another object is to provide such a motor in combination with a pump wherein the motor unit is hermetically sealed from the surrounding environment.

Other objects, advantages and novel features of the present invention will become apparent from the following detailed description of the invention when considered in conjunction with the accompanying drawing.

SUMMARY OF THE INVENTION

The invention comprises a pancake, d.c., electric motor in which the rotor element is integrally connected to the load which may, for example, be the impeller of a pump or turbine. The rotor is formed with a central, peripheral, annular recess into which the coils of the stator element extend. Faces of the rotor lie on opposite sides of the stator and permanent magnets are set into the rotor faces at the same radial extension as the stator-coil poles. The shaft of the motor is stationary and the rotor is coupled to a sleeve bearing which rotates around the shaft. The motor/pump assembly is hermetically sealed externally against leakage of the pumped fluid. Internally, a small amount of pressurized pumped fluid is allowed to leak past a labyrinthine seal and circulate through passages in the motor to cool the motor parts and to lubricate the sleeve bearing.

BRIEF DESCRIPTION OF THE DRAWING

The single FIGURE is an axial cross-section of an embodiment of the invention.

The same elements or parts throughout the FIGURE of the drawing are designated by the same reference characters.

DETAILED DESCRIPTION

FIG. 1 is a cross-sectional view of an embodiment of the invention taken parallel to the motor's longitudinal axis. A brushless d.c. motor of the "pancake" type has an annular stator 12 including at least two stator coils 14. The stator 12 comprises a flange 15 lying inside a peripheral annular recess 16 in the center of the rotor 18 and is part of the motor housing, or casing, 28. On both sides of the stator 12 are faces 17 of the rotor 18 separated from the stator by an air gap 20. Inserted in each rotor face 17 adjacent to the stator 12 are permanent magnets 22 of samarium cobalt, or neodymium iron, (or other high-energy magnetic material) at the same radial extension as the stator coils 14.

A sleeve bearing 24, preferably made of carbon, surrounds the stationary shaft 26 of the pancake motor 10, the shaft 26 being bonded to the motor casing 28 by a suitable means such as welding. The bearing 24 is coupled to rotate with the rotor 18 by means of bolts 25.

One side (the right side in FIG. 1) of the rotor 18 is directly coupled to a load, in this case the rotating shaft 30 of a pump 32 used to move the liquid propellant of a rocket engine. The shaft 30 supports the blades of the pump inducer 34 and the pump impeller 36.

The propellant liquid flows in at the right side, as indicated by the arrows is pre-pressurized by the inducer 34 (if pressurization is needed, as in high-speed pumps, an inducer is used; otherwise not) and pushed to the left through the impeller 36 into the fluid collector volute recess 60 and out through the pump discharge in casing 28. A small amount of propellant liquid is used to cool the rotor and stator parts. In one method, the portion of the fluid used for motor coolant and bearing lubrication proceeds from the fluid collector volute recess 60 to leak past a labyrinthine seal 38 between the rotor 18 and the motor casing 28. Arrows 40 show the path of the coolant fluid. The fluid is forced through a coolant passage 42 into peripheral, annular coolant passages 44 annularly surrounding the stator coils 14 and located within the body of the stator 12. From annular coolant passages 44, the cooling and lubricating fluid flows down through passage 46 which divides into two sections 47 and 47'. The first section 47 directs a portion of the fluid between the sleeve bearing 24 and the shaft 26 to act as a lubricant and cooling medium for the sleeve bearing 24. The second section 47' communicates with radial hole or port 51 in the proximal end of shaft 26 which passes into a bore 48 extending through the center of the shaft 26. The bore 48 also communicates with the interface of the sleeve bearing 24 and the shaft 26, and fluid entering bore 48 flows through radial holes 49 and between sleeve bearing 24 and shaft 26. The fluid flowing between sleeve bearing 24 and the shaft 26 combines with the fluid passing out of the bore 48 through radial holes 49 and converge again in a recess 50, or low-pressure region, between the shaft 26 and the rotor 18 and then flow out to the main propellant flow between the inducer 34 and the impellers 36 through passages 52 in the rotating shaft 30.

A feature of the invention is that the shaft 26 of the motor 10 is sealed against the main propellant flow although a certain amount of leakage flow for cooling and lubrication is provided.

Another feature of the invention is that the rotor is axially thrust balanced with respect to magnetic forces because the rotor magnets are on opposite sides of the stator coil poles so that the thrust of one rotor is balanced out by the thrust of the other.

A further feature is that the casing is hermetically sealed to the internal components. The motor and pump components are sealed from each other except that some leakage flow is allowed for lubrication and cooling purposes.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A unitary electric magnetic-thrust balanced motor and fluid pump system for use in a reaction engine comprising:
   a hermetically-sealed motor casing having an exterior and interior;
   a stationary shaft supported wholly within and bonded to the casing interior;
   an internal sleeve bearing supported rotatably by the stationary shaft;
   an internal rotor having two opposing faces and including a peripheral annular recess formed in the center of the rotor;
   opposing rotor faces positioned on opposite sides of the recess;
   means for coupling the sleeve bearing rotatably with the rotor;
   an internal annular stator, having at least two stator coils and poles, housed inside the rotor peripheral annular recess;
   an internal rotating shaft having a proximal end and a distal end integrally coupled to the rotor at the proximal end thereof;
   a central bore within the stationary shaft passing from the proximal end to the distal end thereof;
   radial holes formed in the shaft at the proximal end and at the distal end in communication with the bore;
   permanent magnets set into the rotor faces in opposing relationship to the stator coils;
   labyrinthine seals formed on the rotating shaft near the distal end thereof;
   an impeller integrally associated with the distal portion of the rotor;
   means for introducing a fluid into the impeller;
   a fluid collector volute recess formed within the casing in functional association with the impeller; and
   means for introducing and channeling a motor coolant and lubricant fluid into the motor and fluid pump system.

2. A motor and fluid pump system according to claim 1 wherein said means for introducing and channeling said motor coolant and lubricant fluid into the system includes lubricating passageways associated with the fluid collector volute and the labyrinthine seals and communicating with the rotor, the stator, and the motor casing interior.

3. A motor and fluid pump system according to claim 1 wherein said means for introducing and channeling said motor coolant and lubricant fluid into the system further includes coolant passages associated with the labyrinthine seals and communicating with peripheral annular coolant passages annularly surrounding the stator coils and located within the stator for cooling the stator coils.

4. A motor and fluid pump system according to claim 1 wherein said means for introducing and channeling said motor coolant and lubricant fluid into the system further includes
   bifurcating coolant and lubricating passages depending from the annular coolant passages surrounding the stator coils;
   the bifurcating coolant and lubricating passages forming two sections;
   one section diverting to radial holes communicating with the shaft bore at the proximal end of the shaft causing said coolant and lubricating fluid to pass into the shaft bore at the proximal end and exit the shaft bore through the radial holes proximate the distal end of the shaft;
   second section of the bifurcating coolant passage interfacing at the proximal end of the sleeve bearing whereby said coolant and lubricant fluid is forced between the sleeve bearing and the shaft; and
   a fluid collection recess at the distal end of the shaft including passages in the rotating shaft communicating between the recess and the impeller whereby said coolant and lubricating fluid introduced into the pump system is reintroduced into the fluid collector volute recess.

5. A motor and fluid pump system according to claim 1 wherein the means for coupling the sleeve bearing rotatably with the rotor comprise bolts.

6. A motor and fluid pump system according to claim 1 wherein the shaft is bonded to the casing by welding.

7. A motor and fluid pump system according to claim 1 wherein the means for introducing and channeling said motor coolant and lubricant fluid into the motor and fluid pump system comprises a pump inducer.

8. A motor and fluid pump system according to claim 1 wherein the motor coolant and lubricant fluid is a propellant.

9. A motor and fluid pump system according to claim 1 wherein the sleeve bearing is made of carbon.

10. A motor and fluid pump system according to claim 1 wherein the rotor is axially thrust balanced by the placement of the rotor permanent magnet on opposite sides of each of said stator coils and poles.

* * * * *